(12) United States Patent
Brambilla et al.

(10) Patent No.: US 9,323,633 B2
(45) Date of Patent: Apr. 26, 2016

(54) DUAL MASTER JTAG METHOD, CIRCUIT, AND SYSTEM

(71) Applicant: STMICROELECTRONICS, INC., Coppell, TX (US)

(72) Inventors: Marco Brambilla, La Tronche (FR); Ulderic Lacour, San Jose, CA (US); Cecilia Ozdemir, Los Gatos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 271 days.

(21) Appl. No.: 13/852,223

(22) Filed: Mar. 28, 2013

(65) Prior Publication Data

US 2014/0298122 A1   Oct. 2, 2014

(51) Int. Cl.
| G06F 11/00 | (2006.01) |
| G06F 11/25 | (2006.01) |
| G01R 31/3177 | (2006.01) |
| G06F 11/267 | (2006.01) |

(52) U.S. Cl.
CPC .................................... G06F 11/267 (2013.01)

(58) Field of Classification Search
None
See application file for complete search history.

(56) References Cited

U.S. PATENT DOCUMENTS

| 6,425,100 | B1* | 7/2002 | Bhattacharya | 714/724 |
| 6,526,535 | B1* | 2/2003 | Warren | 714/727 |
| 6,934,898 | B1* | 8/2005 | Goff | 714/727 |
| 6,981,191 | B2* | 12/2005 | Dorsey | 714/733 |
| 7,185,251 | B2* | 2/2007 | Moyer et al. | 714/729 |
| 2003/0046625 | A1* | 3/2003 | Menon et al. | 714/727 |
| 2005/0204216 | A1* | 9/2005 | Daily et al. | 714/724 |
| 2005/0283692 | A1* | 12/2005 | Whetsel | 714/726 |
| 2006/0090110 | A1* | 4/2006 | Steinbusch | 714/724 |
| 2009/0296933 | A1* | 12/2009 | Akselrod | G01R 31/318555 380/277 |
| 2010/0058130 | A1* | 3/2010 | Somasundaram et al. | 714/733 |
| 2011/0185243 | A1* | 7/2011 | Wong | 714/727 |
| 2014/0181605 | A1* | 6/2014 | Lingannagari | G06F 11/3656 714/727 |

* cited by examiner

*Primary Examiner* — Justin R Knapp
(74) *Attorney, Agent, or Firm* — Seed IP Law Group PLLC

(57) ABSTRACT

A dual-master controller includes a plurality of JTAG data registers including a controller-mode register that stores information indicating a standard JTAG or a processor-controlled mode of operation. A JTAG TAP controller receives control signals over a standard test access port and a processor controller receives processor control signals over an external processor bus. A selection multiplexer outputs either signals on the standard JTAG access port or the external processor bus responsive to a JTAG mode selection signal. A logic circuit activates the JTAG mode selection signal responsive to the force JTAG signal being active or information in the controller-mode register indicating the standard JTAG mode, and deactivates the JTAG mode selection signal responsive to the force JTAG signal being deactivated or the information in the controller-mode register indicating the processor-controller mode. An instruction decoder and multiplexer circuit applies control signals from the selection multiplexer to control the JTAG data registers.

21 Claims, 11 Drawing Sheets

| CPUJDRCMD[35:0] (JDR Command (Input)) ||
|---|---|
| Bit Number | Bit definition |
| 63:36 | Reserved |
| 35:20 | JTAG Data Register size |
| 19:4 | JTAG instruction (not all bits matter, see instruction size configuration) |
| 3 | cmd_rst_n-synchronous to jdr_clk<br>Note, this is NOT the same as the jdr_rst_n reset port |
| 2 | Update-synchronous to jdr_clk |
| 1 | Capture-synchronous to jdr_clk |
| 0 | Shift-synchronous to jdr_clk |

*FIG. 4B*

| CPUWRDATA[63:0] (JDR Write Data (Input)) ||
|---|---|
| Bit Number | Bit definition |
| 63:0 | Data Input for Shift |

*FIG. 4C*

| ESEL (JDR Read Data Endian (Input)) ||
|---|---|
| Bit Number | Bit definition |
| 0 | 0- Read Data endian is the same as Write Data<br>1- Read Data endian is opposite Write Data |

*FIG. 4D*

| CPURDDATA[63:] (JDR READ Data (Output)) ||
|---|---|
| Bit Number | Bit definition |
| 63:0 | Data output, Valid after 'busy' signal is de-aserted (returns to 1'b0). |

*FIG. 4E*

| BUSY (Busy (Output)) ||
|---|---|
| Bit Number | Unused |
| 0 | Busy asserted after command is accepted and de-asserted when command is completed. User must allow for the 'busy' signal to return to 1'b0 before proceeding with another command. |

*FIG. 4F*

DUAL MASTER JTAG METHOD, CIRCUIT, AND SYSTEM

TECHNICAL FIELD

The present disclosure relates generally to test systems, and relates, more specifically, to Joint Test Action Group (JTAG) test circuitry for integrated circuits that includes two master controllers to allow the test circuitry to comply with the JTAG or IEEE 1149.1 standard while also providing the flexibility for users to control the test circuitry to perform desired customized testing.

BACKGROUND

The testing of integrated circuit devices mounted on printed circuit boards (PCBs) has become more difficult as the density of such devices has increased while the size of the printed circuit boards on which the devices are mounted have decreased. Mounting technologies such as surface mount devices have also made the testing of the devices and printed circuit boards containing the devices more difficult. As a result, modern integrated circuit devices typically include internal test circuitry to allow for the testing of the devices mounted on a printed circuit board. More specifically, modern integrated circuit devices typically include test circuitry that complies with the Joint Test Action Group (JTAG) or IEEE 1149.1 standard, allowing printed circuit boards containing the devices and the devices themselves to be more easily tested according to standardized protocols that are part of this widely adopted standard.

The JTAG standard utilizes a boundary scan architecture that enables the JTAG test circuitry to set and read the values of signals on pins of the integrated circuit devices contained on the printed circuit board without having direct physical access to those pins, as will be appreciated by those skilled in the art. The JTAG test circuitry includes an interface that is known as a Test Access Port (TAP) and a TAP controller that operates in response to signals provided on the interface to control instructions and data registers to thereby test core logic circuitry and interconnects of the integrated circuit device containing the JTAG test circuitry. Manufacturers may include customized test circuitry as part of the JTAG test circuitry contained in their integrated circuit devices in order to allow various types of custom testing to be done on the core logic circuitry and interconnects of their devices. When such customized test circuitry is included, however, the JTAG test circuitry must still include certain structure and functionality to comply with the JTAG standard. Thus, in these situations the JTAG test circuitry must comply with the standard while also performing the desired customized testing functionality, which can undesirably complicate the test circuitry and increase the area occupied by the test circuitry on the integrated circuit device.

There is a need for improved JTAG test circuitry that complies with the JTAG standard while also providing desired customized testing functionality.

SUMMARY

According to one embodiment described in the present disclosure, a dual-master controller includes a plurality of JTAG data registers including a controller-mode register operable to store information indicating either a standard JTAG or a processor-controlled mode of operation. A JTAG TAP controller is adapted to receive control signals over a standard test access port and a processor controller is adapted to receive processor control signals over an external processor bus. A selection multiplexer is coupled to the standard access port and the external processor bus and is coupled to the JTAG TAP controller and the processor controller. The selection multiplexer is operable to output either signals on the standard JTAG access port or the external processor bus responsive to a JTAG mode selection signal. A logic circuit is coupled to the controller-mode register and is coupled to the selection multiplexer and is adapted to receive a force JTAG signal. The logic circuit is operable to activate the JTAG mode selection signal responsive to the force JTAG signal being active or the information in the controller-mode register indicating the standard JTAG mode of operation, and is operable to deactivate the JTAG mode selection signal responsive to the force JTAG signal being inactive or the information in the controller-mode register indicating the processor-controller mode of operation. An instruction decoder and multiplexer circuit is coupled to the selection multiplexer and to the JTAG TAP controller, and coupled to the standard test access port, the instruction decoder and multiplexer circuit operable to apply control signals from the selection multiplexer to control the JTAG data registers.

BRIEF DESCRIPTION OF THE DRAWINGS

FIG. 4B is a table illustrating the command portion of the external processor bus according to one embodiment of this bus.

FIG. 4C is a table illustrating the write data portion of the external processor bus according to one embodiment of this bus.

FIG. 4D is a table illustrating the endian select portion of the external processor bus according to one embodiment of this bus.

FIG. 4E is a table illustrating the read data portion of the external processor bus according to one embodiment of this bus.

FIG. 4F is a table illustrating the busy signal portion of the external processor bus according to one embodiment of this bus.

DETAILED DESCRIPTION

According to one embodiment described in the present disclosure, JTAG test circuitry includes dual-master controllers. The dual-master controller operates in a standard JTAG mode as a conventional JTAG test access port (TAP) controller to control instruction and data registers of the JTAG test circuitry and perform desired testing of the integrated circuit device containing the test circuitry. The dual-master controller also operates in a CPU-to-JTAG-data-register (CPU-to-JDR) mode as a CPU-to-JDR or "processor controller" to allow a central processing unit (CPU) or processor, either internal to or external to the integrated circuit device containing the JTAG test circuitry, to control data registers in the JTAG test circuitry and perform desired custom testing of the integrated circuit device. The overall operation of this embodiment will be explained in more detail below.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

Figure 1:
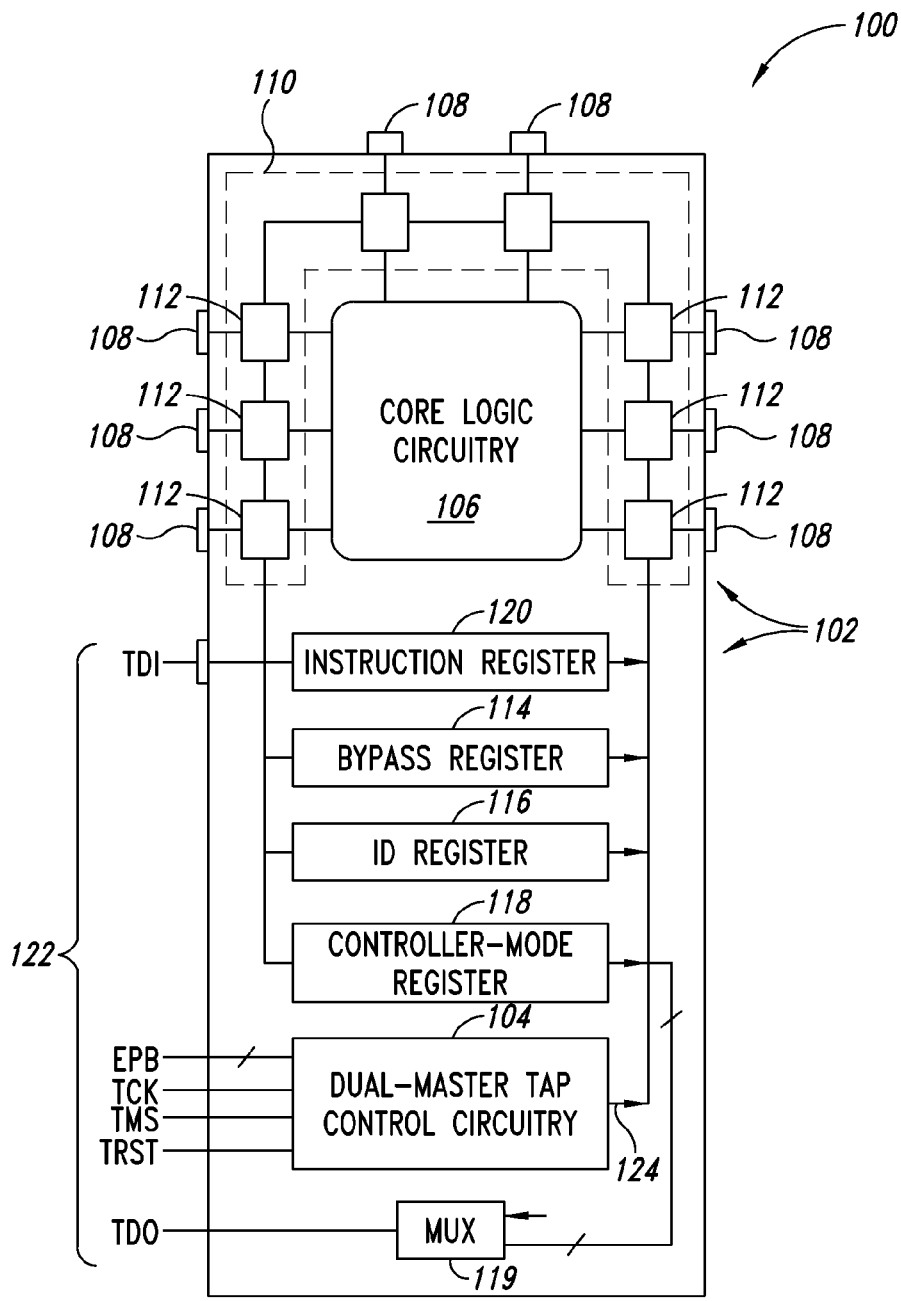
FIG. 1 is a functional block diagram of an integrated circuit device including JTAG test circuitry having a dual-master controller according to one embodiment.

FIG. 1 is a functional block diagram of an integrated circuit device 100 including JTAG test circuitry 102 having dual-master TAP control circuitry 104 according to one embodiment. The integrated circuit device 100 includes core logic circuitry 106 designed to perform the desired functionality of the device, such as digital signal processing circuitry, memory circuitry, and so on. The core logic circuitry 106 is coupled to external circuitry (not shown) through input/output pads (or pins) 108, where the external circuitry corresponds to other integrated circuit devices or electronic components that are external to the integrated circuit device 100. The JTAG test circuitry 102 includes a boundary scan register 110 coupled between the core logic circuitry 106 and the pins 108. More specifically, the boundary scan register 110 includes a number of serially-connected boundary scan cells 112 that operate in different modes to provide desired testing functionality. The boundary scan cells 112 can be used for testing of the core logic circuitry 106 but are more typically utilized for testing interconnects between the integrated circuit device 100 and other devices external to the integrated circuit device. Each boundary scan cell 112 can latch the value of the signal on the corresponding pin 108, apply a desired signal value on the corresponding pin, supply a desired signal value to the core logic circuitry 106, and also functions in a shift register mode to allow desired test data to be serially shifted into and out of the boundary scan register 110, as will be appreciated by those skilled in the art.

The boundary scan register 110 is one of the "data registers" contained in the JTAG test circuitry 102. In addition, the JTAG test circuitry 102 is shown to include other typical data registers as well, such as a bypass register 114 and device identification register 116, as well as a controller mode register 118 that is used to control which one of the master controllers contained in the dual-master TAP control circuitry 104 controls the JTAG test circuitry 102, as will be explained in more detail below. The JTAG test circuitry 102 would typically include additional data registers (not shown) for performing desired interconnect testing and testing on the core logic circuitry 106, as will be described in more detail below. A multiplexer 119 receives the outputs of the data registers 110, 114, 116, and 118 and in response to a selection signal SEL couples a selected one of these registers to provide the contents of the selected register as a test data output (TDO) signal.

The JTAG test circuitry 102 also includes an instruction register 120 that operates in combination with the dual-master TAP control circuitry 104 to control the operation of the data registers 110, 112-118 and thereby provide the desired testing of the device 100 including testing of the core logic circuitry 106. A test access port 122 provides the standard interface to the JTAG test circuitry 102 and includes the standard control and data signals forming this interface that control the operation of the dual-master TAP control circuitry 104 during the JTAG mode of operation. More specifically, the test access port 122 includes a test data input (TDI) signal through which desired input test data is input to the JTAG test circuitry 102 and also includes the test data output (TDO) signal through which generated output test data is provided to external circuits.

In embodiments described in the present disclosure, the test access port 122 also includes an external processor bus (EPB) bus over which a processor (not shown in FIG. 1) provides data and control or command signals to control the operation of the controller 104 during the CPU-to-JDR mode of operation. The EPB bus is not present in a conventional TAP port. Also, note the processor is "external" to the integrated circuit device 100 and will be referred to as an "external processor" in the following description. The same is true for the EPB bus. This merely means that the processor and EPB bus are "external" to the block of circuitry forming the device 100, and does not mean that the processor and the EPB bus over which the processor communicates with the device 100 must be on a separate integrated circuit or chip as the device 100. The processor and bus EPB can be on the same chip as the integrated circuit device 100, such as where the processor and integrated circuit device 100 are a system-on-a-chip (SOC).

Each of the data registers 110 and 114-118 along with the instruction register 120 are selected under control of the dual-master TAP control circuitry 104 to be coupled between the nodes or pins on which the TDI and TDO signals are applied, as will be explained in more detail below. Note the mode of operation, either JTAG or CPU-to-JDR mode, of the dual-master TAP control circuitry 104 determines which ones of the data registers the controller utilizes, and the controller only utilizes certain ones of the registers in each mode. For example, the dual-master TAP control circuitry 104 only accesses the instruction register 120 when operating in the JTAG mode and never accesses this register in the CPU-to-JDR mode. Furthermore, note that the selection of the data registers 110, 114-120 in some instances depends on the contents of other ones of the registers, and thus the controller 104 utilizes these contents in operation to select the data registers. For example, during the JTAG mode the controller 104 utilizes the contents of the instruction register 120 to select various ones of the data registers 110 and 114-118 to be utilized during testing. Also, when operating in the CPU-to-JDR mode, the controller 104 selects the data registers in response to corresponding signals on the external processor bus EPB, which is part of the test access port 122.

In operation during the JTAG mode, the dual-master TAP control circuitry 104 controls the selection and operation of the data registers 110 and 114-118 and instruction register 120 under control of a test clock (TCK) signal, test mode select (TMS) signal, and test mode reset (TRST) signal applied through the test access port 122. In operation during the CPU-to-JTAG mode, the dual-master TAP control circuitry 104 similarly controls selection of the proper data registers 110, 114-118 in response to the signals on the external processor bus EPB. As will be described in more detail below with reference to FIG. 3A, the dual-master TAP control circuitry 104 includes two master controllers that are state machines that operate in response the signals applied on the test access port 122 to select and control the operation of the data and instructions registers 110, 112-120 and control the overall operation of the JTAG test circuitry 102. The TCK signal is a clock signal and the TMS signal is a binary signal having either a logic 0 or a logic 1 value, with the dual-master TAP control circuitry 104 going from state-to-state responsive to the TMS signal during the JTAG mode, and the controller generating corresponding control signals 124 to control the registers 110 and 112-120. External circuitry activates the TRST signal to reset the JTAG controller portion of the dual-master TAP control circuitry 104. Separate signals on the EPB bus reset the processor controller portion of the dual-master TAP control circuitry 104, as will be explained in more detail below with regard to FIG. 3A. In the embodiment of FIG. 1 the test access port 122 thus includes the TDI, TCK, TMS, TRST, TDO, and EPB bus as seen in FIG. 1.

Figure 2:
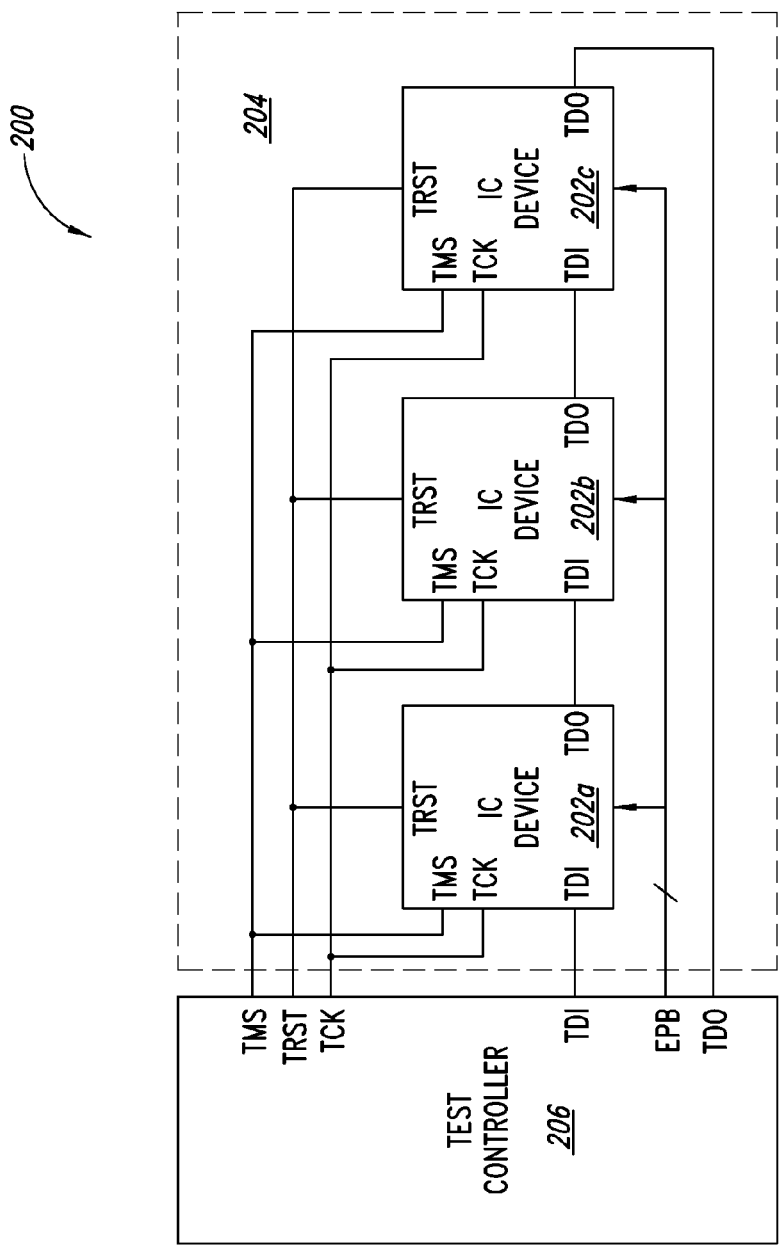
FIG. 2 is a functional block diagram of an electronic system including several integrated circuit devices having the JTAG test circuitry of FIG. 1 interconnected in a daisy-chained configuration.

FIG. 2 is a functional block diagram of an electronic system 200 including several integrated circuit devices 202a-202c containing the JTAG test circuitry 102 (not shown) of FIG. 1 interconnected in a daisy-chained configuration on a printed circuit board 204. This is the typical manner in which the JTAG test circuitry 102 of multiple integrated circuit devices is interconnected on a printed circuit board. A test controller 206 controls the JTAG text circuitry 102 in the devices 202a-c to perform desired testing operations on the devices via the test access port 122 of each device. More specifically, the test controller 206 controls the TDI, TCK, TMS, TRST, TDO, and signals on the EPB bus to thereby test the integrated circuit devices 202a-c. The EPB bus allows the test controller 206 to place the dual-master TAP control circuitry 104 into the CPU-to-JDR mode of operation and to thereafter control the CPU-to-JDR controller to control the data registers 110, 114-118 and perform desired customized testing of the devices 202a-c. The test controller 206 can, of course, also place the dual-master tap control circuitry 104 into the JTAG mode of operation as well and operate in combination with the control circuitry to perform testing of the device 100. In this way the devices 202a-c are JTAG compliant devices and custom testing may also be performed on the devices.

Figure 3A:
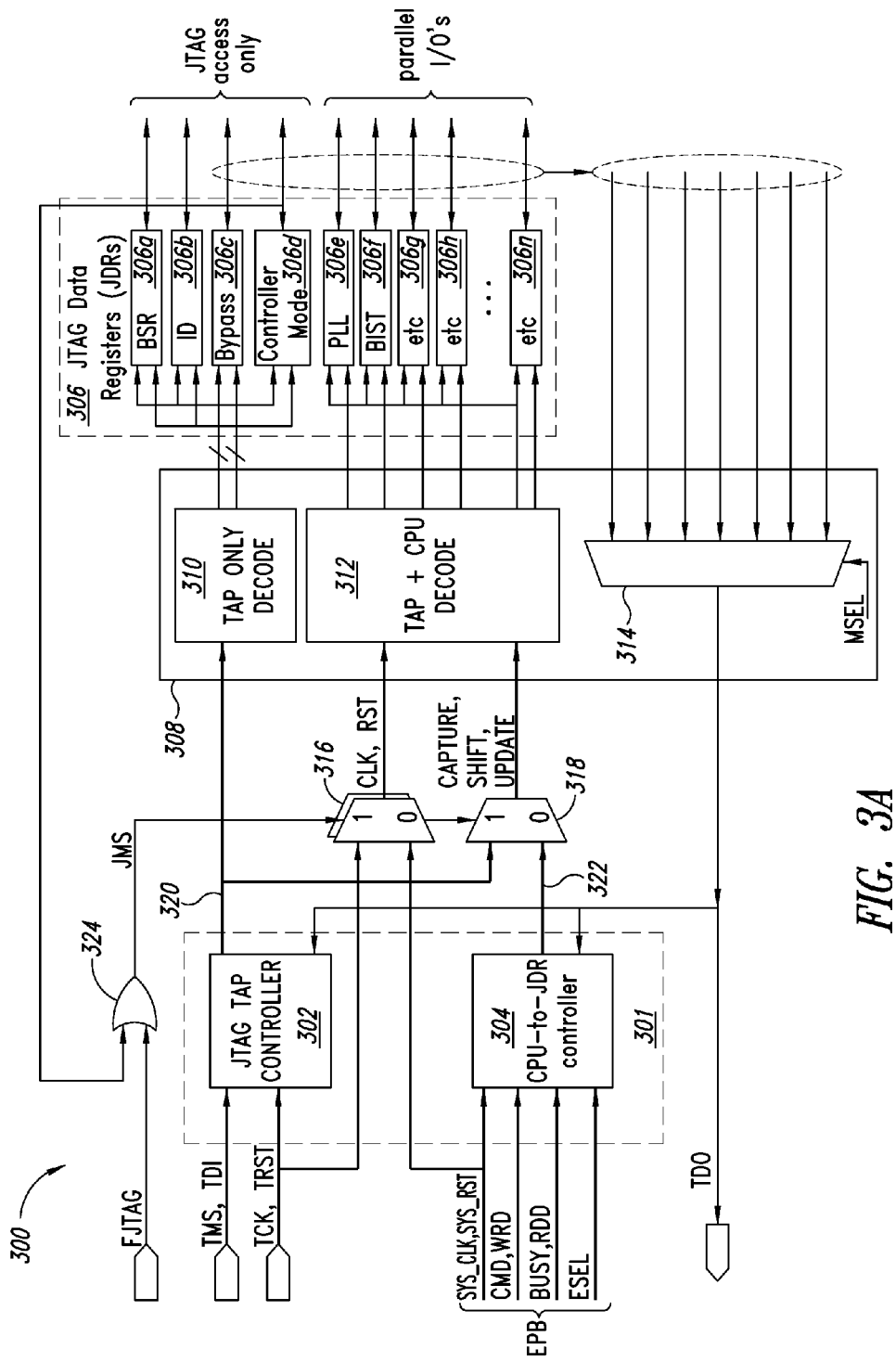
FIG. 3A is a functional block diagram of JTAG test circuitry including dual controllers according to one embodiment described in the present disclosure.

FIG. 3A is a functional block diagram illustrating in more detail JTAG test circuitry 300 according to one embodiment described in the present disclosure. The JTAG test circuitry 300 includes dual-master TAP control circuitry 301 including a JTAG TAP controller 302 and a CPU-to-JDR controller 304. The JTAG test circuitry 300 of FIG. 3A is accordingly one embodiment of the JTAG test circuitry 102 of FIG. 1. In operation of the JTAG test circuitry 300, the dual-master TAP control circuitry 301 operates in either a JTAG mode or a CPU-to-JDR mode to control the overall operation of the test circuitry and device containing the test circuitry. More specifically, either the TAP controller 302 in the JTAG mode or the CPU-to-JDR controller 304 in the CPU-to-JDR mode controls the other components of the JTAG test circuitry to perform desired interconnect testing and testing of core logic circuitry (not shown in FIG. 3A) contained in the integrated circuit device containing the JTAG test circuitry, as will be described in more detail below.

As will be appreciated by those skilled in the art, JTAG test circuitry is primarily used in testing an integrated circuit device during manufacturing to ensure the device is operating properly. Accordingly, in the JTAG test circuitry 300 the JTAG tap controller 302 is enabled in this situation to provide this conventional testing functionality for the integrated circuit device. In addition, the CPU-to-JDR controller 304 enables the JTAG test circuitry 300 to be utilized after the integrated circuit device containing the JTAG test circuitry has completed manufacturing testing. For example, the CPU-to-JDR controller 304 allows a processor or other device (not shown in FIG. 3A) to occasionally test the functionality of integrated circuit devices containing the JTAG test circuitry 300 when the integrated circuit devices are operating in a completed electronic system. The CPU-to-JDR controller 304 includes a parallel-handshake interface through which such an external device communicates with the CPU-to-JDR controller 304 and also includes state-machine circuitry that replicates the same control signals generated by the JTAG tap controller 302 for controlling data registers and other components in the JTAG test circuitry 300, as will now be described in more detail below.

The JTAG test circuitry 300 includes a number of JTAG data registers 306, with individual ones of these JTAG data registers being labeled as data registers 306a-n in FIG. 3A. These JTAG data registers 306a-n include a boundary scan register (BSR) 306a, an identification (ID) register 306b, a bypass register 306c, and a controller-mode register 306d as shown in FIG. 3A. In addition, the JTAG test circuitry 300 includes other conventional user data registers such as a phase-locked loop (PLL) register 306e, a built-in-self-test (BIST) register 306f, and other user data registers 306g-n that are utilized in testing core logic circuitry (not shown) or performing other types of tests on the integrated circuit device containing the test circuitry 300.

The JTAG test circuitry 300 also includes an instruction decode and multiplexer circuit 308 that performs the functionality of the instruction register 120 previously described with reference to FIG. 1 to select and control the operation of the data registers 306. A TAP-only decoder 310 in the instruction decode and multiplexer circuit 308 operates under control of the JTAG tap controller 302 to control the boundary scan register 306a, ID register 306b, bypass register 306c, and controller-mode register 306d. The JTAG tap controller 302 can also access the data registers 306e-n, as will be discussed in more detail below. The TAP-only decoder 310 only operates under control of the TAP controller 302 and not the CPU-to-JDR controller 304.

A TAP and CPU decoder 312 in the instruction decode and multiplexer circuit 308 operates under control of either the JTAG tap controller 302 or the CPU-to-JDR controller 304 to control the user data registers 306e-n. Through the TAP and CPU decoder 312, the JTAG TAP controller 302 can also access the data registers 306e-n, as mentioned above. Thus, the data registers 306a-d can only be accessed by the JTAG tap controller 302 via the TAP-only decoder 310. These data registers 306a-d are not accessible by the CPU-to-JDR controller 304. Thus, the JTAG TAP controller 302 can access all data registers 306a-n via the decoders 310 and 312, while the CPU-to-JDR controller 304 can access only the data registers 306e-n via the decoder 312. The instruction decode and multiplexer circuit 308 also includes a test data output (TDO) multiplexer 314 that operates in response to mux selection (MSEL) signals to couple a selected data register 306a-n to its output and thereby provide the TDO signal from the JTAG test circuitry 300. The active one of the TAP-only decoder 310 and the TAP and CPU decoder 312 applies the MSEL signals to the TDO multiplexer 314 to select the desired data register 306.

The JTAG test circuitry 300 further includes control-signal multiplexers 316 and 318 through which the proper control signals are coupled to control the TAP and CPU decoder 312. More specifically, the control-signal multiplexer 316 applies either the TCK and TRST signals of the standard JTAG TAP interface 122 (see FIG. 1) or a processor or system clock signal SYS_CLK and a processor or system reset signal SYS_RST to clock and reset the TAP and CPU decoder 312. The control-signal multiplexer 318 couples either control signals 320 from the JTAG TAP controller 302 or control signals 322 from the CPU-to-JDR controller 304 to the TAP and processor decoder 312. A mode-selection circuit 324, which is an OR gate in the embodiment of FIG. 3A, provides a JTAG mode selection signal JMS to control the control-signal multiplexers 316 and 318. The mode-selection circuit 324 generates the JMS signal in response to the contents of a mode bit in the controller-mode register 306d and a force JTAG signal FJTAG provided by the processor (not shown in FIG. 3A). As seen in FIG. 3A, the controller-mode register 306d is coupled to one input of the OR gate 324.

In operation, the JTAG circuitry 300 operates in either the standard-JTAG mode or CPU-to-JDR mode of operation, with the mode being controlled by the contents of the controller-mode register 306d and the FJTAG signal. When the FJTAG signal is active high (a logic 1), the OR gate 324 applies a high JMS signal to the multiplexers 316 and 318. In the response to the high JMS signal, the multiplexer 316 couples the TCK and TRST signals to the TAP and CPU decoder 312 and the multiplexer 318 couples the control signals 320 from the JTAG TAP controller 302 to the TAP and CPU decoder. In this way, the asserted FJTAG signal results in the control signals 320 from the JTAG TAP controller 302 and standard JTAG TAP signals TCK and TRST being applied to control the TAP and CPU decoder 312 and in this way the JTAG test circuitry 300 operates in the JTAG mode of operation. In this mode, the JTAG TAP controller 302 controls the operation of the test circuitry 300, accessing and controlling the data registers 306a-d through the TAP-only decoder 310 and the data registers 306e-n through the TAP and CPU decoder 312. In this way, operation of the test circuitry 300 in the JTAG mode is forced when the FJTAG signal is asserted.

Conversely, when the FJTAG signal is inactive (i.e., logic 0), the contents of the controller-mode register 306d determine what signals the multiplexers 316 and 318 apply to control the TAP and CPU decoder 312. When the register 306d stores a logic 0, the JTAG test circuitry 300 operates in the CPU-to-JDR mode with the OR gate 324 driving the JMS signal inactive low, causing the multiplexers 316 and 318 to couple the SYS_CLK and SYS_RST signals to clock and reset the TAP and processor decoder 312. The control signals 322 from the CPU-to-JDR controller 304 also are applied through the multiplexer 318 to the TAP and CPU decoder 312 to control the data registers 306e-n. Thus, when the FJTAG signal is inactive and the controller-mode register 306d stores a logic 0 the test circuitry 300 operates in the CPU-to-JDR mode, with the CPU-to-JDR controller 304 controlling the operation of the test circuitry including the data registers 306e-n. The default value of the controller-mode register 306d is a logic 0, meaning that the test circuitry 300 operates in the CPU-to-JDR mode and the external processor controls the CPU-to-JDR controller 304 to access the desired data registers 306e-n and control the operation of the test circuitry.

When operating in the CPU-to-JDR mode, asserting the FJTAG signal active high forces the test circuitry 300 into the JTAG mode of operation. In addition, the JTAG TAP controller 302 can override control by the external processor (i.e., exit the CPU-to-JDR mode) any time by changing the contents of the controller-mode register 306d. Setting this register to a logic 1 causes the OR gate 324 to drive the JMS signal active high such that the circuitry 300 thereafter operates in the JTAG mode.

In the CPU-to-JDR mode of operation, the processor applies signals on the external processor bus EPB to control the operation of the CPU-to-JDR controller 304 and thereby control the operation of the test circuitry 302. The EPB bus includes several signals as seen in FIG. 3A. More specifically, the EPB bus includes the system clock signal SYS_CLK and system reset signal SYS_RST previously discussed. The EPB bus further includes command signals CMD, read and write data signals, and other signals as will explained in more detail below with reference to FIG. 4A.

Figure 3B:
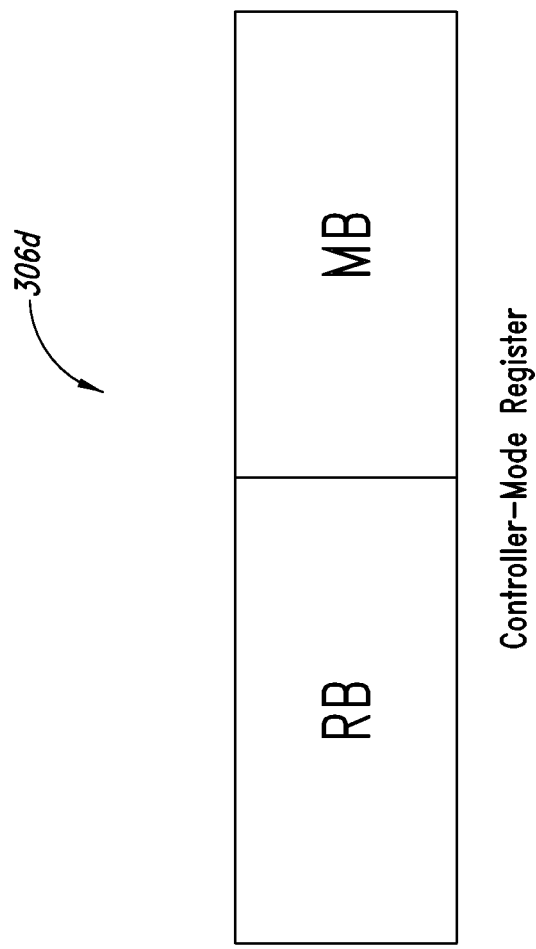
FIG. 3B illustrates one embodiment of the controller-mode register of FIG. 3A.

As illustrated in FIG. 3B, in addition to the mode bit MB, the controller-mode register 306d also includes a reset bit RB. The reset bit RB is either set or not set to control the resetting of the shared JTAG registers, namely the JTAG data registers 306e-n in FIG. 3A that can be accessed by both the JTAG TAP controller 302 and the CPU-to-JDR controller 304. The reset bit RB stored in the controller-mode register 306d in combination with the test mode reset signal TRST function to allow the JTAG-only registers 306a-d (FIG. 3) to be reset without requiring the processor to assert the test mode reset signal TRST on the external processor bus EPB. In this way, when switching into the JTAG mode of operation the controller 301 sets the bits in the controller-mode register 306d to MB=1 (JTAG mode) and RB=0, which both switches the mode of operation to the JTAG mode and resets the shared JTAG registers 306e-n. The reset bit RB is thereafter set to RB=1 so that operation remains in the JTAG mode while removing the reset signal RST being applied to the JTAG data registers 306e-n. Note that the above structure for the controller-mode register 306d prevents the need for the test mode reset signal TRST to be asserted whenever the JTAG mode of operation is entered to be sure the registers 306e-n have been properly reset. In order to ensure that all the registers 306 are reset properly, both the RB bit in controller-mode register 306d and the EP-RST signal default to active (i.e., to logic 0 in the illustrated embodiment) upon reset of the integrated circuit device 100.

Figure 3C:
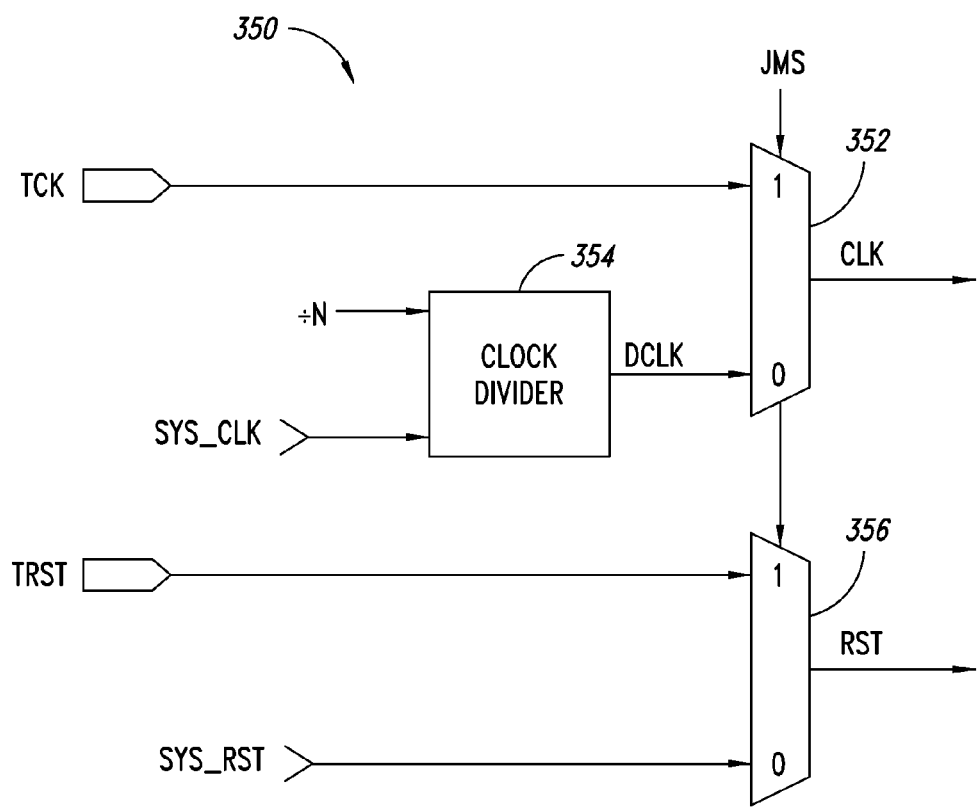
FIG. 3C is a functional block diagram of clock and reset circuitry contained in the selection multiplexer 316 of FIG. 3A for providing a clock signal CLK and reset signal RST for the inactive mode of operation.

FIG. 3C is a functional block diagram of clock and reset circuitry 350 contained in the selection multiplexer 316 of FIG. 3A for providing a clock signal CLK and reset signal RST for the inactive mode of operation. Before describing the operation of the circuitry 350, it should be noted that during the CPU-to-JDR mode of operation no clock signal TCK or reset signal TRST is being driven or provided on the corresponding pins of the standard TAP interface. The same is true during the JTAG mode of operation, with neither the system clock SYS_CLK or system reset SYS_RST typically being provided on the corresponding pins of the external processor bus EPB. As a result, circuitry 350 insures that a clock signal CLK and reset signal RST will always be available to control the registers 306 regardless of the mode of operation.

The clock and reset circuitry 350 includes a first multiplexer 352 that receives the TCK signal on a first input and a divided DCLK signal generated by a clock divider 354 on a second input. Depending on the state of the JTAG mode selection signal JMS, the multiplexer 352 outputs either the TCK signal or the DCLK signal from the clock divider 354 as the clock signal CLK that is applied to the data registers 306. The clock divider 354 divides an always running system clock SYS_CLK by a divisor N to generate the divided clock signal DCLK having the proper frequency for controlling the data registers 306. The circuitry 350 further includes a multiplexer 356 that operates in response to the JMS signal to provide either the test mode reset signal TRST or system reset signal SYS_RST (part of the EPB bus) as the reset signal RST that is applied to control the registers 306.

Figure 4A:
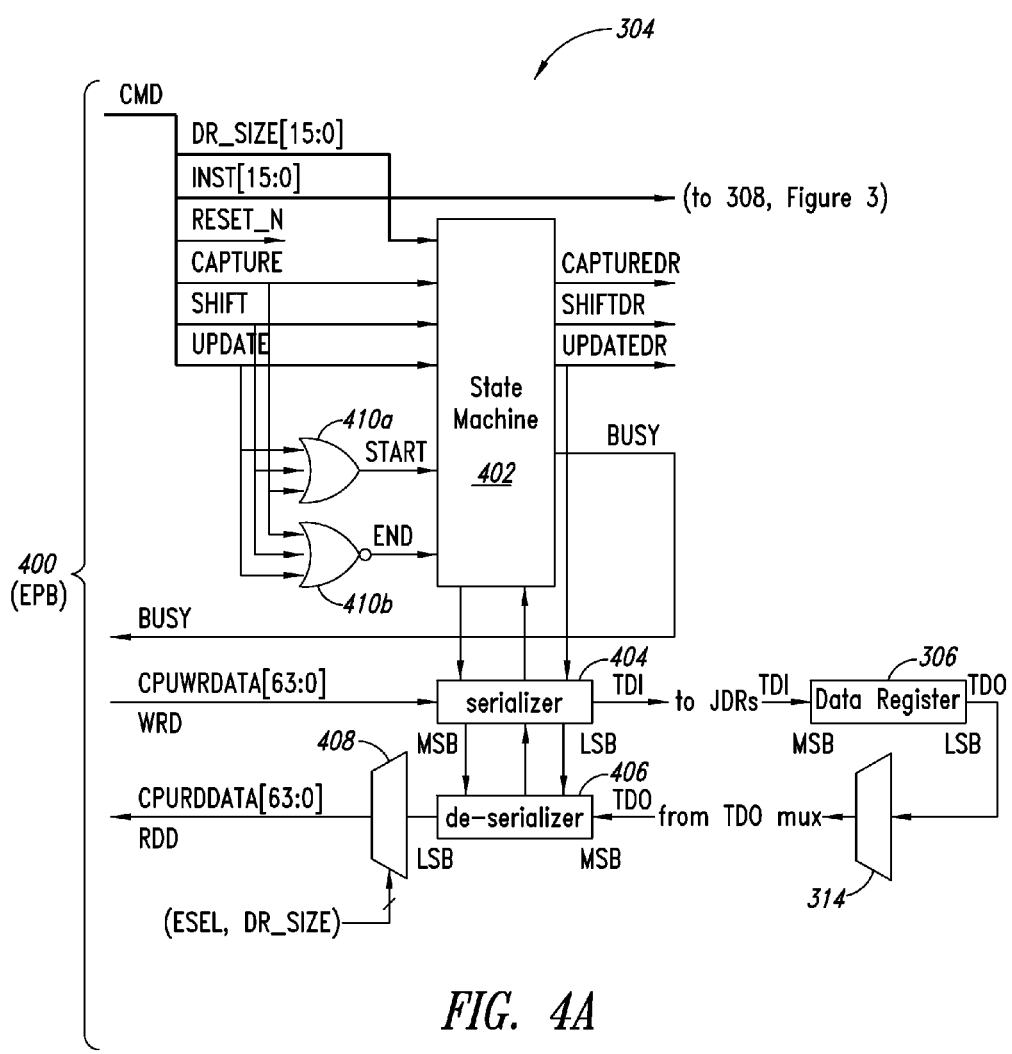
FIG. 4A is a more detailed functional block diagram of the CPU-to-JDR controller of FIG. 3A according to one embodiment of the controller.

FIG. 4A is a more detailed functional block diagram of the CPU-to-JDR controller 304 of FIG. 3A according to one embodiment of this controller. The CPU-to-JDR controller 304 includes a front-side interface 400 that corresponds to the external processor bus EPB previously discussed above with reference to FIGS. 1-3. The front-side interface 400 includes a CPU-to-JDR command bus CMD over which a processor (not shown) applies a command CPUJDRCMD[35:0] to the controller. The controller 304 further includes a state machine 402 that receives the CPUJDRCMD[35:0] command and in response to the command generates data register control signals SHIFTDR, UPDATEDR, and CAPTUREDR that control the JTAG data registers 306e-n of FIG. 3A. The state machine 402 also generates a status signal BUSY that is activated and returned to the processor via the interface 400 upon receipt of a valid CPUJDRCMD[35:0] command.

The controller 304 further includes a serializer 404 coupled to the test data input TDI of the JTAG data registers 306e-n of FIG. 3A, with a single generic data register 306 being illustrated in FIG. 4A to represent all the JTAG data registers 306e-n. In the following description of FIG. 4A only this signal data register 306 will be referenced and such references should be understood to include all the data registers 306e-n of FIG. 3A. The serializer 404 is also coupled to a write data bus WRD over which the processor provides a write test data word CPUWRDATA[63:0] to the controller 304 and operates under control of the state machine 402 to serialize the parallel write test data word for input over the test data input TDI to the appropriate JTAG data register 306. Note the write test data bus WRD is part of the front-side interface 400.

A de-serializer 406 in the controller 304 is coupled to the test data output TDO of the JTAG data register 306 and is also coupled through an endian selection multiplexer 408 to a read data bus RDD over which the controller 304 provides a read test data word CPURDDATA[63:0] to the processor. The de-serializer 406 operates under control of the state machine 402 to de-serialize (i.e., make parallel) the serial read test data on the test data output TDO of the data register 306 and to provide this de-serialized test data as the CPURDDATA[63:0] word to be read by the processor. The endian selection multiplexer 408 operates to change the endianness of the bits in the CPURDDATA[63:0] word, when necessary.

As will be appreciated by those skilled in the art, endianness refers to the ordering of bits in the data word in this context and due to the nature of the operation of JTAG data registers in which all bits shift least significant bit (LSB) first, the serialized read data that is output on the test data output TDO is endian swapped or inverted. The endian selection multiplexer 408 allows the order of the bits in the CPURDDATA[63:0] word to be inverted or swapped back again so the original endianness of the bits is present. This is not always desired, however, and so the multiplexer 408 allows the processor to determine whether to swap the bits of the CPURDDATA[63:0] word through an endian selection signal ESL that is part of the front-side interface 400. In this way the processor can activate the ESL signal to invert the endianness of the CPURDDATA[63:0] word being read on the RDD bus or can deactivate the ESL signal to leave the endianness of the CPURDDATA[63:0] word the same.

In the front-side interface 400, the CMD bus is a parallel bus over which the processor testing the integrated circuit device that contains the test circuitry 300 of FIG. 3A and the CPU-to-JDR controller 304 performs desired testing of the integrated circuit device. A user that wants to utilize the additional testing functionality provided by the CPU-to-JDR controller 304 must provide the required bridge logic (not shown) between the processor bus and the CMD bus. Thus, if the processor utilizes, for example, the advanced microcontroller bus architecture (AMBA) the processor could utilize the advance high-performance bus (AHB), advanced peripheral bus (APB), or advanced extensible interface (AXI), or the processor could utilize the IBM processor local bus (PLB) or the PCI express bus. In each case, a user would design the required bridge logic between the processor bus and the CMD bus. The bridge logic would of course provide the required interfaces between the processor bus and each of the CMD, WRD, and RDD busses of the front-side interface 400.

The state machine 402 provides a status signal BUSY that is active (i.e., asserts the BUSY signal) upon receipt of the command and remains active until read data corresponding to the received CPUJDRCMD[63:0] command is available on the RDD bus. The state machine 402 thus maintains the BUSY signal active until the read test data CPURDDATA[63:0] is available and this read test data is only read by the external processor after the state machine 402 deactivates the BUSY signal. In this way the BUSY signal functions as a "handshake" signal between the controller 304 and external processor. A new CPUJDRCMD[63:0] command being applied to the state machine 402 and the reading of the read test data CPURDDATA[63:0] thus occur only after the BUSY signal has been deactivated.

In FIG. 4A, two three-input OR gates 410a and 410b function to provide start and end signals to the state machine 402 to thereby initiate and terminate operation of the state machine, respectively. The OR gate 401a initiates operation of the state machine 402 responsive to signals CPU-CAPTURE, CPU-SHIFT, and CPU-UPDATE provide by the external processor on the command CMD portion of the external bus EPB (processor interface 400). Thus, any of the CPU-CAPTURE, CPU-SHIFT, or CPU-UPDATE signals being asserted cause the OR gate 410a to activate a START signal and thereby activate the state machine 402. When none of the CPU-CAPTURE, CPU-SHIFT, or CPU-UPDATE signals is asserted, the OR gate 410b drives an END signal active low, terminating operation of the state machine 402 and thereby the controller 304 in the CPU-to-JDR mode of operation. The START and END signals more specifically cause the state machine 402 to exit or enter an idle state of operation in which the state machine monitors the status of the CPU-CAPTURE, CPU-UPDATE, and CPU-SHIFT signals to determine the next state of operation, as will be explained in more detail below with reference to FIG. 5.

The front-side interface 400 or external processor bus EPB utilizes a command/acknowledge type of handshake operation to drive this parallel interface. As previously mentioned, the proper bridge logic between the EPB bus and the bus of the external processor must be provided by a user of the test circuitry 300 (FIG. 3). The different portions of the EPB bus will now be described in more detail with reference to FIGS.

4B-4F. Recall, the state machine 402 is activated via some of these command inputs as discussed above with reference to the OR gates 410a and 410b of FIG. 4A.

FIG. 4B is a table illustrating the command bus CMD portion of the external processor bus EPB according to one embodiment of this bus. As seen in the figure, the command bus CMD includes a data register size field DR_SIZE, a JTAG instruction field INST, a command reset field RESET_N, along with a command capture CAPTUER, command shift SHIFT, and command update UPDATE fields. FIG. 4C is a table illustrating the write data bus WRD (i.e., also referred to as CPUWRDATA) portion of the external processor bus EPB according to one embodiment of this bus. In this embodiment the WRD bus is a 64-bit bus. FIG. 4D is a table illustrating the endian select portion (i.e., the ESL signal) of the external processor bus EPB according to one embodiment of this bus. The ESL signal is a single bit that determines whether the endianness of the read data CPURDDATA is the same or the opposite as that of the write data CPUWRDATA. FIG. 4E is a table illustrating the read data portion CPURDDATA of the external processor bus EPB according to one embodiment of this bus. In this embodiment, the read data bus RDD is also a 64-bit bus. FIG. 4F is a table illustrating the busy signal BUSY portion of the external processor bus EPB according to one embodiment of this bus.

Figure 5:
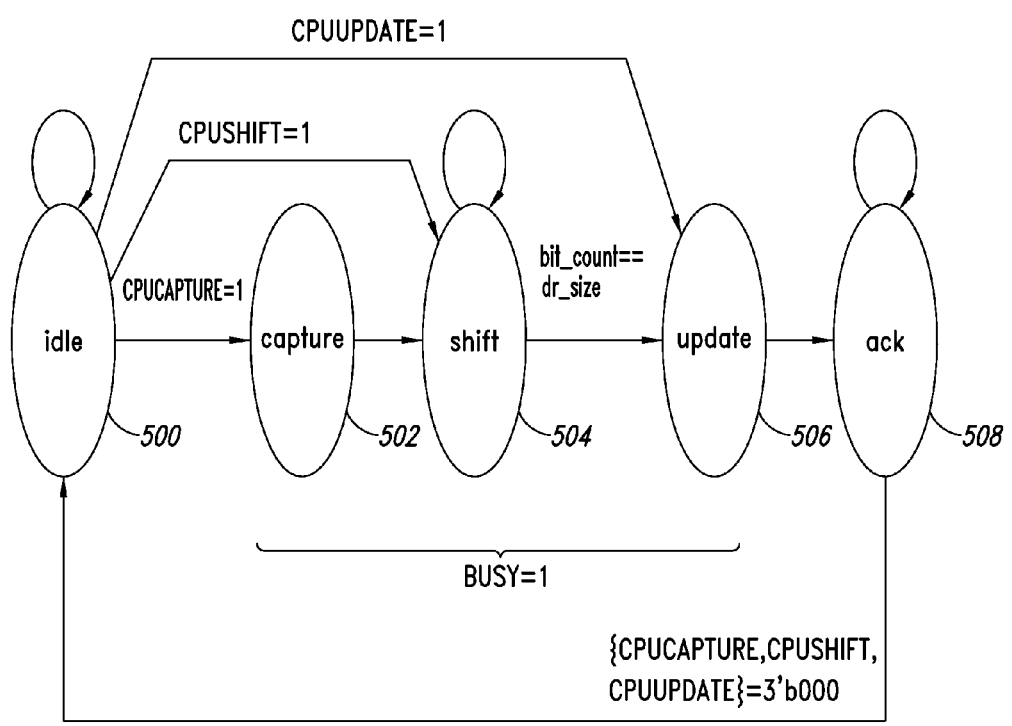
FIG. 5 is state diagram illustrating the operation of the state machine of FIG. 4A.

FIG. 5 is state diagram illustrating the operation of the state machine 402 of FIG. 4A. The state machine 402 remains in an idle state 500 until any of the CPUCAPTURE, CPUSHIFT, and CPUUPDATE signals is activated. When the state machine 402 detects the CPUCAPTURE, CPUSHIFT, and CPUUPDATE signal has been asserted the state machine goes from idle state 500 to the corresponding capture state 502, shift state 504, or update state 506, respectively, as illustrated in the figure. As indicated in the state diagram, once the state machine 402 has captured the DR_SIZE, INSTRUCTION, and CPUWRDATA in the 502, the state machine goes to step 504 and shifts the data into the appropriate data registers 306 (FIG. 3) with the number of bits being shifted being determined by the value of DR_SIZE. From the state 504 the state machine 402 proceeds to the state 506 and updates the values stored in the data registers 306. Once state machine 402 has completed operation in the state 506, the state machine proceeds to state 508 and acknowledges completion of the initial command, with the BUSY signal thereafter being deactivated (i.e., logic 0) to signal to the external processor that read data on the read data bus RDD is available to be read by the processor. Note that in the described embodiments the signals on the EPB bus are synchronous to the system clock SYS_CLK but this need not be the case. In other embodiments, the signals on the EPB bus, such as the CMD signals, asynchronous to either the system clock SYS_CLK or the test clock TCK.

Figure 6:
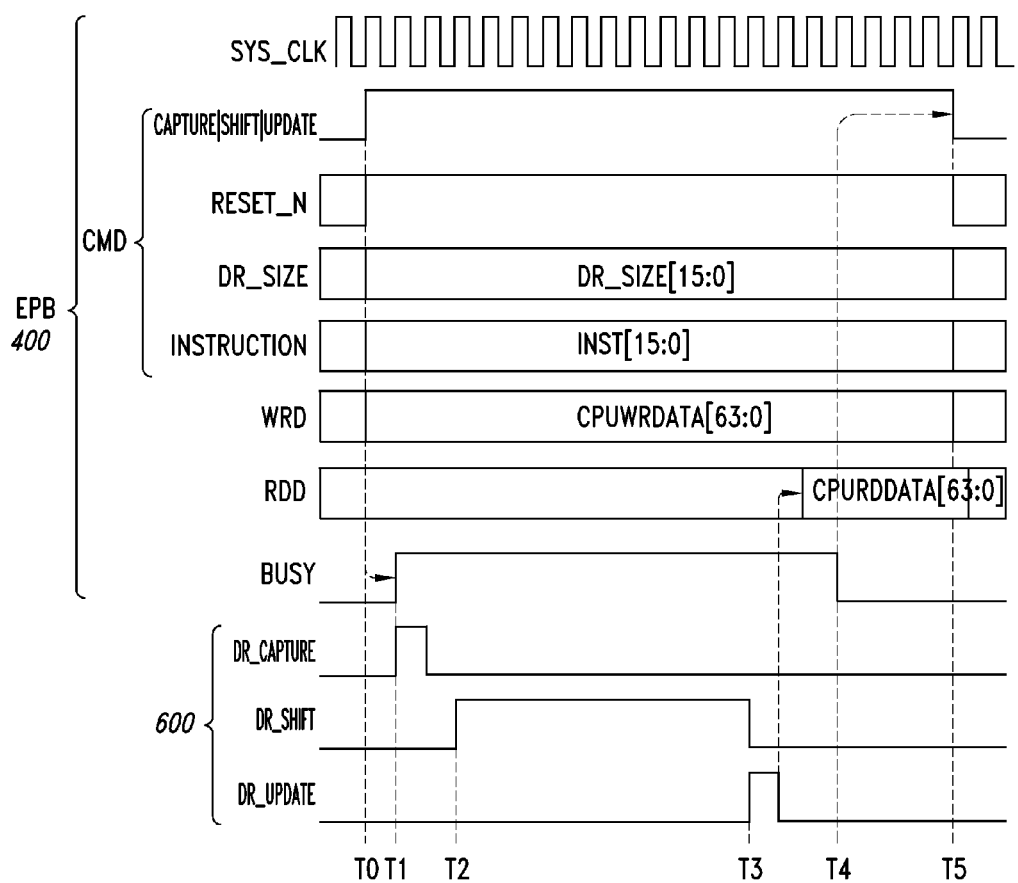
FIG. 6 is a timing diagram illustrating the signals on the external processor bus during operation of the CPU-to-JDR controller of FIG. 3A.

FIG. 6 is a timing diagram illustrating the signals on the external processor bus during operation of the CPU-to-JDR controller 304 of FIG. 3A. The upper portion of this timing diagram illustrates signals on the front-side bus 400 (i.e., EPB bus) while the lower portion illustrates back-side signals 600 generated by the CPU-to-JDR controller 304 (see FIG. 4A) that are actually applied to the data registers 306 (see FIGS. 3A and 4A). At a time T0, the processor applies a command CMD on the command bus and the command CAPTURE, SHIFT, and UPDATE signals are appropriately asserted so that the state machine 402 properly processes the applied command. As seen in FIG. 6, the command CMD includes the reset RESET_N, data register size DR_SIZE, and instruction INST portions previously discussed above.

At a time T1, the state machine 402 activates the BUSY signal, indicating to the processor that the command CMD has been received and is being processed. Also at the time T1 the state machine 402 activates the back-side DR_CAPTURE signal that is applied to the data registers 306 to capture the new test data in the registers. At a time T2, the state machine 402 activates the DR_SHIFT signal that is applied to the data registers 306 to thereby shift data into the data registers. At a time T3 the data has been shifted into the data registers 306 and the state machine 402 deactivates the DR_SHIFT signal and pulses the DR_UPDATE signal to thereby update the contents of the data registers 306. The state machine 402 deactivates the BUSY signal at a time T4, signaling the external processor that valid read test data CPURDDATA is available on the read data bus RDD. At a time T5 the command CAPTURE, SHIFT, and UPDATE signals are deactivated, signaling the end of the illustrated cycle of the state machine 402.

Figure 7:
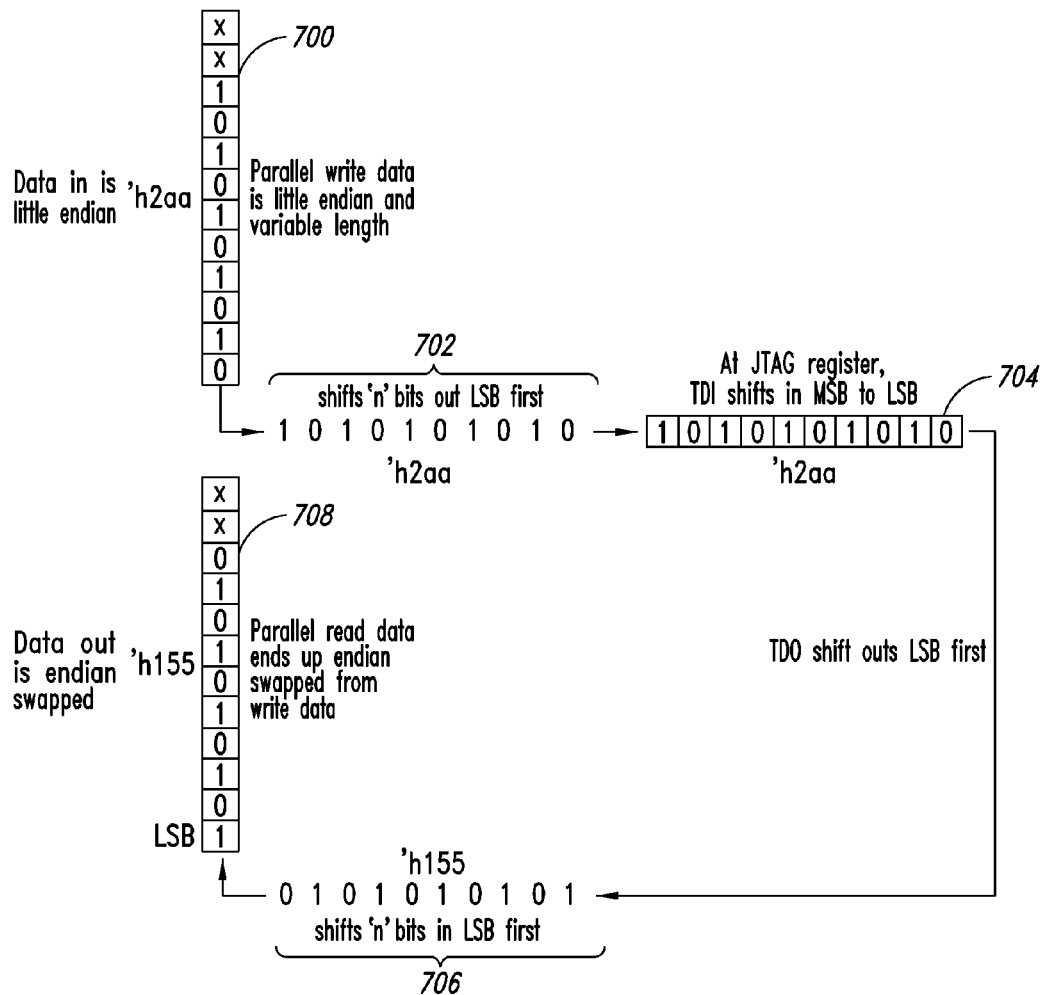
FIG. 7 is a functional diagram illustrating in more detail the operation of the endian selection multiplexer of FIG. 4A.

FIG. 7 is a functional diagram illustrating in more detail the operation of the endian selection multiplexer 408 of FIG. 4A. FIG. 7 shows the natural flow of serial data from parallel input test data at 700 to serial data 702 and 704 supplied to the JTAG data register serial data shifted out of the JTAG data register at 706 and then to parallel read data at 708 provided on the RDD bus. With the JTAG data registers 306 (FIG. 3A), all bits shift least significant bit LSB first. As a result, the serialized read data naturally comes back endian swapped. This is seen in FIG. 7 where parallel write data 700 is shown and this parallel write data being shift LSB first 702 into the JTAG register at 704 is illustrated. Now, when this data at 704 is shifted out LSB first as seen at 706 such that when it is parallel shifted at 708 to be provided as test data out TDO it is reversed or endian swapped as illustrated. The endian selection multiplexer 408 operates to reverse the endian swapped test data out TDO at 708, namely to provide the LSB on the corresponding LSB line of the RDD bus. Some designs, however, take advantage of this natural change endian change so the mux 408 allows the processor to control this mux such that either mode can be supported.

One skilled in the art will understood that even though various embodiments and advantages thereof have been set forth in the foregoing description, the above disclosure is illustrative only, and changes may be made in detail, and yet remain within the broad principles of the present disclosure. For example, some of the components described above may be implemented using either digital or analog circuitry, or a combination of both, and also, where appropriate, may be realized through software executing on suitable processing circuitry. Therefore, the present disclosure is to be limited only by the appended claims.

What is claimed is:
1. A dual-master controller, comprising:
   a plurality of JTAG data registers including a controller-mode register configured to store information indicating either a standard JTAG or a processor-controlled mode of operation;
   a JTAG TAP controller adapted to receive control signals over a standard test access port;
   a processor controller adapted to receive processor control signals over an external processor bus;
   a selection multiplexer coupled to the standard access port and the external processor bus and coupled to the JTAG TAP controller and the processor controller, the selection multiplexer configured to output either signals on the standard JTAG access port or the external processor bus responsive to a JTAG mode selection signal;

a logic circuit coupled to the controller-mode register and coupled to the selection multiplexer and adapted to receive a force JTAG signal, the logic circuit configured to activate the JTAG mode selection signal responsive to the force JTAG signal being active or the information in the controller-mode register indicating the standard JTAG mode of operation, and configured to deactivate the JTAG mode selection signal responsive to the force JTAG signal being inactive or the information in the controller-mode register indicating the processor-controller mode of operation; and an instruction decoder and multiplexer circuit coupled to the selection multiplexer and to the standard test access port, and coupled between the JTAG TAP controller and the JTAG data registers, the instruction decoder and multiplexer circuit configured to apply control signals from the selection multiplexer to control the JTAG data registers and to prevent the processor controller from accessing selected ones of the JTAG data registers.

2. The dual-master controller of claim 1, wherein the processor controller comprises a state machine.

3. The dual-master controller of claim 1, further comprising an endian circuit configured to change the endianness of read data output from the instruction decoder and multiplexer circuit.

4. The dual-master controller of claim 1, wherein the controller-mode register stores a reset bit and a mode bit.

5. The dual-master controller of claim 1, wherein the processor controller comprises:
a state machine adapted to be coupled to a command bus portion of the external processor bus and configured to generate control signals for controlling the data registers responsive to command signals on the command bus portion;
a serializer adapted to be coupled to a write bus portion of the external processor bus and operable responsive to the control signals to provide write test data applied on the write bus portion to the data registers; and
a de-serializer adapted to be coupled to a read bus portion of the external processor bus and operable responsive to the control signals to provide read test data from the data registers on the read bus portion.

6. The dual-master controller of claim 5 further comprising an endian circuit coupled between the de-serializer and the read bus portion and configured to change the endianness of read test data applied on the read bus portion responsive to the control signals from the state machine.

7. The dual-master controller of claim 6 further comprising an output multiplexer coupled between the data registers and the de-serializer.

8. The dual-master controller of claim 1, wherein the plurality of JTAG data registers further include a bit scan register, an identification register, a bypass register, and additional user data registers.

9. The dual-master controller of claim 8, wherein the bit scan register, an identification register, a bypass register, and controller-mode register are controlled only by the JTAG TAP controller.

10. The dual-master controller of claim 8, wherein the instruction decoder and multiplexer circuit further comprises a JTAG TAP controller decoding circuit configured to decode signals from the standard test access port provided by the selection multiplexer.

11. The dual-master controller of claim 10, wherein the instruction decoder and multiplexer circuit further comprises a processor decoding circuit configured to decode signals from the external processor bus provided by the selection multiplexer.

12. An electronic system, comprising:
core logic circuitry;
a plurality of JTAG data registers coupled to the core logic circuitry, the JTAG data registers including a controller-mode register configured to store information indicating either a standard JTAG or a processor-controlled mode of operation;
a dual-master controller, comprising,
a JTAG TAP controller adapted to receive control signals over a standard test access port;
a processor controller adapted to receive processor control signals over an external processor bus;
a selection multiplexer coupled to the standard access port and the external processor bus and coupled to the JTAG TAP controller and the processor controller, the selection multiplexer configured to output either signals on the standard JTAG access port or the external processor bus responsive to a JTAG mode selection signal;
a logic circuit coupled to the controller-mode register and coupled to the selection multiplexer and adapted to receive a force JTAG signal, the logic circuit configured to activate the JTAG mode selection signal responsive to the force JTAG signal being active or the information in the controller-mode register indicating the standard JTAG mode of operation, and configured to deactivate the JTAG mode selection signal responsive to the force JTAG signal being inactive or the information in the controller-mode register indicating the processor-controller mode of operation; and
an instruction decoder and multiplexer circuit coupled to the selection multiplexer and to the standard test access port, and coupled between the JTAG TAP controller and the JTAG data registers, the instruction decoder and multiplexer circuit configured to apply control signals from the selection multiplexer to control the JTAG data registers and to deny access by the processor controller to some of the JTAG data registers.

13. The electronic system of claim 12, wherein the core logic comprises a microprocessor.

14. The electronic system of claim 12, wherein the controller-mode register stores a reset bit and a mode bit.

15. The electronic system of claim 12, wherein the processor controller comprises:
a state machine adapted to be coupled to a command bus portion of the external processor bus and configured to generate control signals for controlling the data registers responsive to command signals on the command bus portion;
a serializer adapted to be coupled to a write bus portion of the external processor bus and operable responsive to the control signals to provide write test data applied on the write bus portion to the data registers; and
a de-serializer adapted to be coupled to a read bus portion of the external processor bus and operable responsive to the control signals to provide read test data from the data registers on the read bus portion.

16. The electronic system of claim 15 wherein the dual-mode controller further comprises an endian circuit coupled between the de-serializer and the read bus portion and configured to change the endianness of read test data applied on the read bus portion responsive to the control signals from the state machine.

17. The electronic system of claim 12 wherein the dual-master controller further comprises an output multiplexer coupled between the data registers and the de-serializer.

18. The electronic system of claim 12, wherein the plurality of JTAG data registers further include a bit scan register, an identification register, a bypass register, and additional user data registers.

19. The electronic system of claim 18, wherein the bit scan register, an identification register, a bypass register, and controller-mode register are controlled only by the JTAG TAP controller.

20. The electronic system of claim 18, wherein the instruction decoder and multiplexer circuit further comprises,
   a JTAG TAP controller decoding circuit configured to decode signals from the standard test access port provided by the selection multiplexer, and
   a processor decoding circuit configured to decode signals from the external processor bus provided by the selection multiplexer.

21. A method of controlling JTAG test circuitry in an integrated circuit, the method comprising:
   receiving control signals applied to an external test port of the integrated circuit, the external test port including a standard test access port (TAP) portion and an external processor bus portion;
   providing access to JTAG data registers through the TAP portion of the external test port, the JTAG data registers being part of the JTAG test circuitry contained in the integrated circuit; and
   providing access through instruction decoder and multiplexer circuitry coupled between the external test port and the JTAG data registers to selected ones of the JTAG data registers through the external processor bus portion of the external test port while denying access to JTAG data registers other than the selected ones.

* * * * *